(12) United States Patent
Han et al.

(10) Patent No.: US 9,021,399 B2
(45) Date of Patent: Apr. 28, 2015

(54) STEREOSCOPIC IMAGE REPRODUCTION DEVICE AND METHOD FOR PROVIDING 3D USER INTERFACE

(75) Inventors: Sang-Choul Han, Gyeongsangbuk-Do (KR); Jae-Kyung Lee, Daegu (KR)

(73) Assignee: LG Electronics Inc., Seoul (KR)

( * ) Notice: Subject to any disclaimer, the term of this patent is extended or adjusted under 35 U.S.C. 154(b) by 462 days.

(21) Appl. No.: 13/379,177

(22) PCT Filed: Jul. 22, 2009

(86) PCT No.: PCT/KR2009/004083
§ 371 (c)(1),
(2), (4) Date: Dec. 19, 2011

(87) PCT Pub. No.: WO2010/150936
PCT Pub. Date: Dec. 29, 2010

(65) Prior Publication Data
US 2012/0102435 A1 Apr. 26, 2012

Related U.S. Application Data

(60) Provisional application No. 61/219,783, filed on Jun. 24, 2009.

(51) Int. Cl.
*G06F 3/048* (2013.01)
*H04N 13/00* (2006.01)
*G06F 3/0482* (2013.01)
*H04N 13/02* (2006.01)
*H04N 13/04* (2006.01)

(52) U.S. Cl.
CPC .......... *H04N 13/0029* (2013.01); *G06F 3/0482* (2013.01); *H04N 13/004* (2013.01); *H04N 13/0048* (2013.01); *H04N 13/007* (2013.01); *H04N 13/026* (2013.01); *H04N 13/0402* (2013.01); *H04N 13/0497* (2013.01)

(58) Field of Classification Search
CPC .......... H04N 13/0055; H04N 13/0452; H04N 13/0402; H04N 13/00; H04N 13/0022; H04N 13/0059; H04N 13/026
USPC ........................................................ 715/848
See application file for complete search history.

(56) References Cited

U.S. PATENT DOCUMENTS

| | | | |
|---|---|---|---|
| 7,543,245 B2 | 6/2009 | Irimajiri | |
| 2004/0058715 A1 | 3/2004 | Taniguchi et al. | |
| 2007/0003134 A1 | 1/2007 | Song et al. | |
| 2007/0291110 A1 | 12/2007 | Era | |

FOREIGN PATENT DOCUMENTS

| | | |
|---|---|---|
| CN | 1496183 A | 5/2004 |
| CN | 1893673 A | 1/2007 |

(Continued)

*Primary Examiner* — Omar Abdul-Ali
(74) *Attorney, Agent, or Firm* — Birch, Stewart, Kolasch & Birch, LLP

(57) ABSTRACT

A stereoscopic image reproduction device for providing a 3D user interface includes a UI generator which generates a user interface, a depth information processor which generates a 3D depth for the user interface, and a formatting unit which generates a 3D user interface for the user interface by using the 3D depth. The depth information processor may be integrated with the formatting unit. Various factors used to generate 3D depth perception include at least any one of blur, textual gradient, linear perspective, shading, color, brightness, and chroma, which results in a 3D-type user interface (UI) being shown on a stereoscopic image display.

11 Claims, 6 Drawing Sheets

(56) References Cited

FOREIGN PATENT DOCUMENTS

| CN | 101015220 A | | 8/2007 |
| JP | 2002123842 A | * | 4/2002 |
| JP | 2002-175139 A | | 6/2002 |
| KR | 2001-0083928 A | | 9/2001 |
| KR | 10-2007-0034340 A | | 3/2007 |
| WO | WO 01/16690 A2 | | 3/2001 |

* cited by examiner (a)

(b)

(c)

(d)

Cold color
Low brightness color
Low chroma color

Warm color
High brightness color
High chroma color (a)

(b)

STEREOSCOPIC IMAGE REPRODUCTION DEVICE AND METHOD FOR PROVIDING 3D USER INTERFACE

CROSS REFERENCE TO RELATED APPLICATIONS

This application is the National Phase of PCT/KR2009/004083 filed on Jul. 22, 2009, which claims priority under 35 U.S.C. 119(e) to U.S. Provisional Application No. 61/219,783 filed on Jun. 24, 2009, all of which are hereby expressly incorporated by reference into the present application.

BACKGROUND OF THE INVENTION

1. Field of the Invention

A device and method for reproducing three-dimensional or stereoscopic images and displaying a user interface (UI) for such three-dimensional or stereoscopic images is described.

2. Description of the Related Art

In recent years, as the interest in stereoscopic image services increases, devices for providing a stereoscopic image continues to be developed. Among the methods for implementing such a stereoscopic image, there is a stereoscopic method.

The basic principle of a stereoscopic method relates to a scheme for providing images, which are disposed perpendicular to each other, to the left and right eyes of a viewer in a separate manner, and the visual cortex in the brain of the viewer may interpret such two images as being combined to form a three-dimensional or stereoscopic image. The images disposed perpendicular to each other means that each image does not interfere with the other.

Some specific methods for eliminating interference include, a polarization scheme, a time-sequential scheme, and a spectral scheme.

First, the polarization scheme is a process of separating each image by using a polarizing filter. In other words, different images filtered out by polarizing filters are to be provided to the left and right eye views by applying the polarizing filters perpendicular to each other to an image for the left eye and an image for the right eye, respectively.

The time-sequential scheme is a process of alternately displaying the left and right images, and allowing active glasses worn by the user to be synchronized with the alternately displayed images to separate each image. In other words, when images are alternately displayed, a shutter of the active glasses synchronized therewith is opened only for an eye view to which the relevant image should be input and closed for the other eye view, and as a result, the left and right images are seen by the viewer in a separated manner.

The spectral scheme is a process of projecting the left and right images through spectral filters having a spectral band in which the RGB spectrums are not overlapped with each other. For such projected left and right images, the left and right images are separately viewable due to the viewer wearing passive glasses mounted with spectral filters, which pass through only certain spectral regions that are set for the left and right images, respectively.

Meanwhile, a user interface may be typically provided in a stereoscopic image reproduction device to allow the user to change a stereoscopic image display setting. The user interface may be provided for the user to change an environment or various settings of the relevant device or to control the operation thereof, and may be provided by displaying a user interface on the display screen.

As an example of displaying and providing a user interface on the display screen, On Screen Display (OSD) techniques may be used. The On Screen Display (OSD) typically provides a screen adjustment function allowing the user to directly select or change the settings of the display screen. In this case, adjustable screen settings may be slightly different from display to display, but may include brightness, contrast, synchronization, RGB adjustment, vertical/horizontal screen size, position adjustment, and the like.

However, the foregoing method of displaying a user interface (UI) on the screen in a stereoscopic image reproduction device in the related art has certain drawbacks.

In a stereoscopic image reproduction device according to the related art, the user interface (UI), which is displayed to allow setting changes or allow control of operations for 3D images, typically has a two-dimensional image format, although 3D images are also displayed thereon upon processing 3D image signals.

Such user interface (UI) with a 2D format being displayed thereon for 3D images causes a mismatch on the entire 3D image screen. Due to this, user satisfaction is degraded when using 3D image services provided by the stereoscopic image reproduction device.

SUMMARY OF THE INVENTION

The features described herein are directed to solving the foregoing problems in the related art by providing a stereoscopic image reproduction device and method that provide a user interface (UI) with a 3D format on a stereoscopic image display.

Another object is to provide a stereoscopic image reproduction device and method capable of controlling stereoscopic effects on a user interface (UI) with a 3D format provided on a stereoscopic image display.

Still another object is to provide a stereoscopic image reproduction device and method capable of providing a user interface (UI) with a 3D format on a stereoscopic image display, thereby enhancing the user's use satisfaction.

In order to accomplish the foregoing objectives, there is provided a stereoscopic image reproduction device for providing a 3D user interface, including a UI generator configured to generate a user interface; a depth information processor configured to generate a 3D depth for the user interface; and a formatting unit configured to generate a 3D user interface for the user interface using the 3D depth.

The depth information processor may be formed with the formatting unit in an integrated manner. Further, certain factors used to generate the 3D depth information may include at least any one of blur, textual gradient, linear perspective, shading, color, brightness, and chroma.

On the other hand, there is provided a stereoscopic image reproduction method for providing a 3D user interface, including a first step of generating a user interface; a second step of generating a 3D depth for the user interface; and a third step of generating a 3D user interface for the user interface using the 3D depth.

According to a stereoscopic image reproduction device and method described herein, a user interface (UI) is provided with a 3D format on a stereoscopic image display.

Further, according to a stereoscopic image reproduction device and method described herein, stereoscopic effects on a user interface (UI) with a 3D format provided by a stereoscopic image display can be controlled.

In addition, according to a stereoscopic image reproduction device and method described herein, a user interface (UI)

with a 3D format may be provided on a stereoscopic image display, thereby enhancing the user's overall satisfaction and 3D experience.

BRIEF DESCRIPTION OF THE DRAWINGS

The accompanying drawings, which are included to provide a further understanding of the invention and are incorporated in and constitute a part of this specification, illustrate some embodiments of the invention and together with the description serve to explain the principles of the invention.

In the drawings.

DETAILED DESCRIPTION OF THE INVENTION

Figure 1:
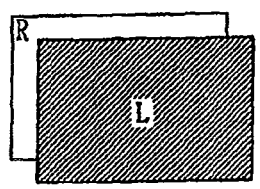
FIG. 1 is a view illustrating various 3D modes applicable to 3D image signals.
Figure 1:
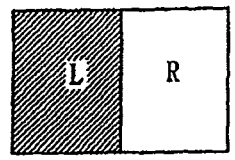
Figure 1:
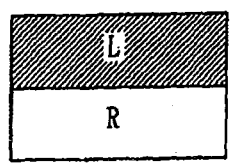
Figure 1:
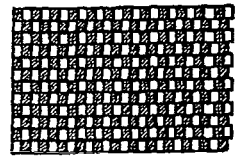

The term 3-D or 3D may be used to describe a visual output or display technology for reproducing three-dimensional images that have the optical illusion of depth perception. With respect to an image for the left eye and an image for the right eye, the visual cortex in the brain of the viewer may interpret such two images as being combined to form a three-dimensional image.

Three-dimensional (3D) display technology employs 3D image processing and expression techniques for a device capable of displaying 3D images. The device capable of displaying 3D images may additionally use a special viewing device in order to provide a 3-dimensional image viewing effect to the viewer.

Examples of devices capable of 3D image display may include a liquid crystal display (LCD) provided with suitable hardware and/or software supporting 3D display technologies, a digital TV screen, a computer monitor, and the like. Examples of the special viewing device may include specialized glasses, goggles, head gear, eyewear, and the like.

Examples of 3D image display technologies include, anaglyph stereoscopic image display technology (typically used together with passive anaglyph glasses), polarized stereoscopic image display technology (typically used together with passive polarized glasses), alternate-frame sequential display technology (typically used together with active shutter glasses/head gear), auto-stereoscopic display technology using a lenticular or barrier screen, and the like. The various concepts and features described hereafter may be applicable to such 3D image display technologies.

One type of 3D image display technology may employ a segmented polarizer adhered to a rotating or alternately operating optical device, for example, a color filter wheel, which requires synchronization with each other. Another type of 3D image display technology may employ a digital light processor (DLP) based on a digital micromirror device (DMD) using rotatable microscopic mirrors disposed in an array arrangement corresponding to the pixels to be displayed.

New types of standards associated with rendering and display technologies (particularly, 3D-TV) for a stereoscopic image are being currently developed by various companies, consortiums, and organizations, and the examples thereof may include SMPTE (the Society of Motion Picture and Television Engineers), CEA (Consumer Electronics Association), 3d@Home consortium, ITU (International Telecommunication Union), and the like. In addition, other standardization groups such as DVB, BDA, ARIB, ATSC, DVD Forum, IEC, and the like, participate therein. MPEG (Moving Picture Experts Group) participates in 3D image coding of multiview images, stereoscopic images, and two-dimensional images having depth information, and multiview video codec extension for MPEG-4 AVC (Advanced Video Coding) is being standardized. Stereoscopic image coding and stereoscopic distribution formatting are related to color shifting (anaglyph), pixel sub-sampling (side-by-side), checkerboard, quincunx, and enhanced video coding (2D+delta, 2D+metadata, and 2D having depth information). The concepts and features described hereafter may be applicable to any of the above-mentioned standards.

Furthermore, at least part of the concepts and features disclosed herein may be related to 3D image display technologies described with respect to image display environments for digital images or 3D TV implementations. However, the detailed description does not limit various features described herein, and may be applicable to other types of display technologies and devices. For example, 3D TV technologies may be applicable to Blu-ray™ devices, console games, cable and IPTV transmission systems, mobile terminal contents transfer protocols, and the like, and in this case they should be compatible to other types of TVs, set top boxes, Blu-ray™ devices (for example, Blu-ray™ Disk (BD) players), DVD players, and TV contents distributors.

For stereoscopic image processing, the left image and the right image may be transmitted to form a stereoscopic image, with each image being transmitted at 60 frames or more per second. In other words, stereoscopic images with minimal or practically no flickering can be implemented when they are displayed at a speed above 120 Hz.

In this case, the 3D display format modes applicable to 3D image signals may include a frame sequential scheme, a side-by-side scheme, a top-down scheme, a checker board scheme, and the like.

Hereinafter, various modes applicable to 3D image signals will be described with reference to FIG. 1, which illustrates various 3D modes applicable to 3D image signals.

FIG. 1A is a view illustrating a frame sequential mode among 3D modes of 3D image signals. The frame sequential mode uses a method of alternately placing images in an sequential manner by using a left image and a right image, respectively, for a frame as illustrated in FIG. 1A.

FIG. 1B is a view illustrating a side-by-side mode among the 3D modes of 3D image signals. The side-by-side mode uses a method of performing ½ sub-sampling on a left image and a right image, respectively, in a horizontal direction, and then placing the sampled left and right images, respectively, on the left and right sides as illustrated in FIG. 1B.

FIG. 1C is a view illustrating a top-down mode among the 3D modes of 3D image signals. The top-down mode uses a method of performing ½ sub-sampling on a left image and a right image, respectively, in a vertical direction, and then placing the sampled left and right images, respectively, on the top and bottom sides as illustrated in FIG. 1C.

FIG. 1D is a view illustrating a checker board mode among the 3D modes of 3D image signals. The checker board mode uses a method of performing ½ sub-sampling on a left image and a right image, respectively, in both horizontal and vertical directions, and then alternately placing the sampled pixels of the left and right images, respectively, as illustrated in FIG. 1D.

The formatter provided in a stereoscopic image reproduction device may receive 3D image signals having various modes as described above, and performs formatting on the signals based on its stereoscopic image display output to transmit the formatted signals to a display device such as an LCD panel.

Figure 2:
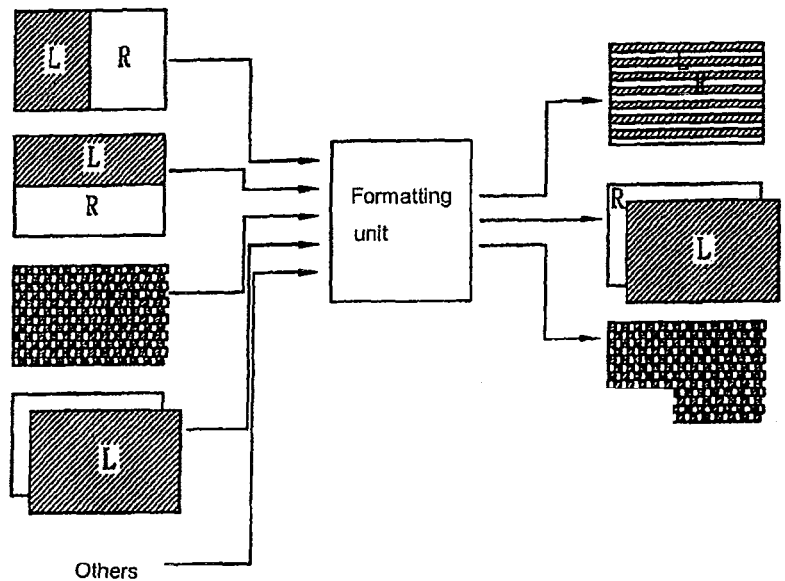
FIG. 2 is a view for explaining an operation in which a formatter in the related art performs formatting on 3D image signals in various modes based on its stereoscopic image display output.

FIG. 2 illustrates the operation of the aforementioned formatter. FIG. 2 is a view for explaining an operation in which a formatter in the related art performs formatting on 3D image signals in various modes based on its stereoscopic image display output.

The formatter may perform formatting on received 3D image signals to visualize 3D images, and also perform 3D visualization on 2D image signals. In order to generate 3D images based on 2D images, the formatter may analyze 2D images to extract a 3D depth from the 2D images. At this time, such factors used may include blur, textual gradient, linear perspective, shading, color, and the like. The formatter may generate a 3D depth for 2D images using such factors for the received 2D images, thereby implementing 3D images from 2D images using the 3D depth.

According to some embodiments described herein, a method of providing a 3D user interface on a stereoscopic image display with a minimal change of the 2D user interface (UI) is proposed. In other words, according to such embodiments, factors capable of obtaining a 3D depth for 2D UI may be used to provide 3D UI when displaying stereoscopic images information.

Hereinafter, such embodiments will be described in detail with reference to the accompanying drawings. The same reference numerals denote the same elements throughout all the drawings.

Figure 3:
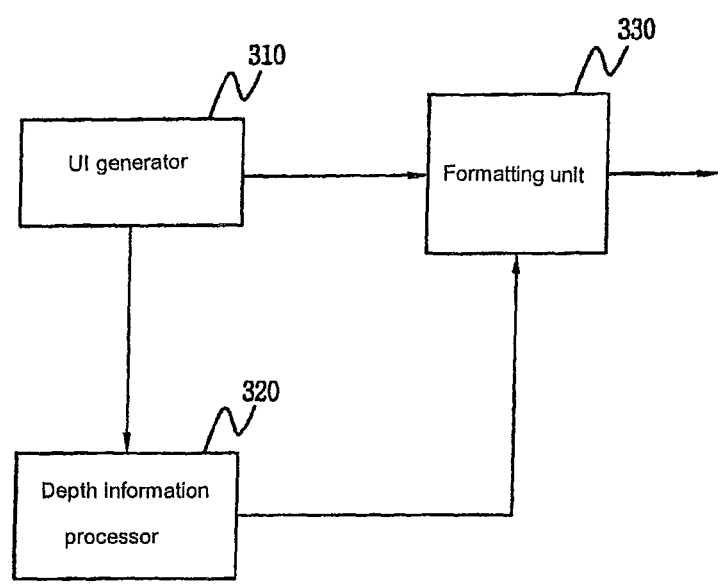
FIG. 3 is a block diagram illustrating an example of configuring a stereoscopic image reproduction device according to embodiments described herein.

Referring to FIG. 3, the configuration and operation of a stereoscopic image reproduction device will be described. FIG. 3 is a block diagram illustrating an example of configuring a stereoscopic image reproduction device.

A stereoscopic image reproduction device according may include a user interface (UI) generator 310 configured to generate a user interface (UI), a depth information processor 320 configured to generate a 3D depth for the generated UI, and a formatting unit 330 configured to generate 3D UI using the 3D depth as well as perform formatting on 3D image signals based on the stereoscopic image display to transmit the formatted signals.

Hereinafter, the configuration and operation of a stereoscopic image reproduction device having the foregoing configuration will be described in more detail. In this embodiment, the UI of the stereoscopic image reproduction device may use On Screen Display (OSD) techniques.

First, the UI generator 310 generates a user interface, namely, an OSD for the user. At this time, the generated OSD may have a conventional 2D format.

The depth information processor 320 may generate a 3D depth for the OSD generated from the UI generator 310. Here, some factors used to generate a 3D depth may include blur, textual gradient, linear perspective, shading, color, brightness, chroma, and the like. The depth information processor 320 may generate a 3D depth for the UI with a 2D format using any one of these factors or using two or more combinations thereof.

The formatting unit 330 may generate a 3D UI for the 2D UI by using the 3D depth information generated from the depth information processor 320. Also, the formatting unit 330 may perform formatting on 3D image signals based on the stereoscopic image display to transmit the formatted signals together with the 3D UI.

Hereinafter, a method of allowing the depth information processor 320 of the invention to generate a 3D depth using each factor as described above will be explained in more detail.

First of all, color may be used as a factor for generating 3D depth information for the 2D UI. Among various colors, a so-called "cold" color may have an effect of reducing the screen view, while a so-called "warm" color may have an effect of enlarging the screen view. Accordingly, a relatively long distance or depth may be set for a "cold" color, whereas a relatively short distance or depth may be set for a "warm" color in the 2D UI in order to generate 3D depth perception for the 3D UI.

Also, as a factor for generating a 3D depth, the brightness or chroma of a color may be used. Here, the brightness indicates a relatively bright or dark level of the color, whereas the chroma indicates a relative clarity or saturation level of the color. In this case, a relatively long distance may be set for a "low" brightness or chroma, whereas a relatively short distance may be set for a "high" brightness or chroma to generate 3D depth perception.

Additionally, blur may be used as a factor for generating 3D depth information for the 2D UI. In this case, a relatively "long" distance may be set for a dull state whereas a relatively "short" distance may be set for a clear state to generate 3D depth perception.

When textual gradient is used as a factor for generating 3D depth information, a relatively "long" distance may be set for a downward textual gradient, whereas a relatively "short" distance may be set for an upward textual gradient to generate 3D depth perception.

When linear perspective is used as a factor for generating 3D depth information, a relatively "long" distance may be set for converged lines, whereas a relatively "short" distance may be set for dispersed lines to generate 3D depth perception.

When shading is used as a factor for generating 3D depth information, a relatively "long" distance may be set for depicting heavy weight objects, whereas a relatively "short" distance may be set for depicting light weight objects to generate 3D depth perception.

Figure 4:
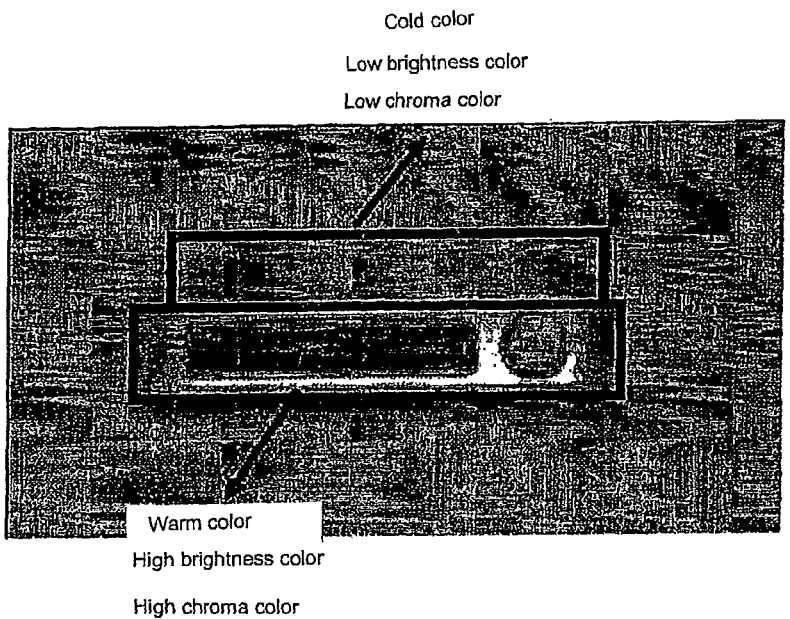
FIG. 4 is a view illustrating an example of using color, brightness and chroma as a factor for generating a 3D depth on a 2D user interface.

FIG. 4 is a view illustrating an example of using color, brightness and chroma as a factor for generating a 3D depth among the foregoing factors. As illustrated in FIG. 4, a long distance may be configured with a cold color, a low brightness or chroma whereas a short distance may be configured with a warm color, a high brightness or chroma on the basis of the user's view location to generate 3D depth perception.

Figure 5:
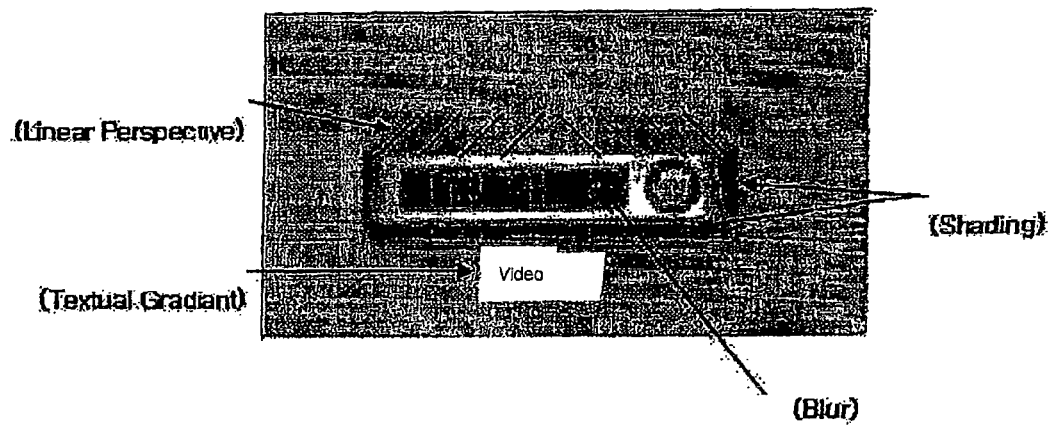
FIG. 5 is a view illustrating an example of using blur, textual gradient, linear perspective and shading as a factor for generating a 3D depth on a 2D user interface.

FIG. 5 is a view illustrating an example of using blur, textual gradient, linear perspective and shading as a factor for generating a 3D depth among the foregoing factors. As illustrated in FIG. 5, a long or short distance may be configured with a long or short distance setting for each factor on the basis of the user's view location to generate 3D depth perception. For example, in case of shading, a long distance may be configured with a dark color whereas a short distance may be configured with a brighter color to implement an effect of 3D images.

As described above, a stereoscopic image reproduction device may generate and apply a 3D depth to a 2D user interface in various ways, thereby implementing a 3D user interface on a stereoscopic image display.

In this embodiment, a stereoscopic image reproduction device may be provided with the depth information processor 320 and the formatting unit 330 in a separate manner, but not necessarily configured in this manner, and furthermore, the controller 330 and the depth information processor 320 may be configured in an integrated manner.

Figure 6:
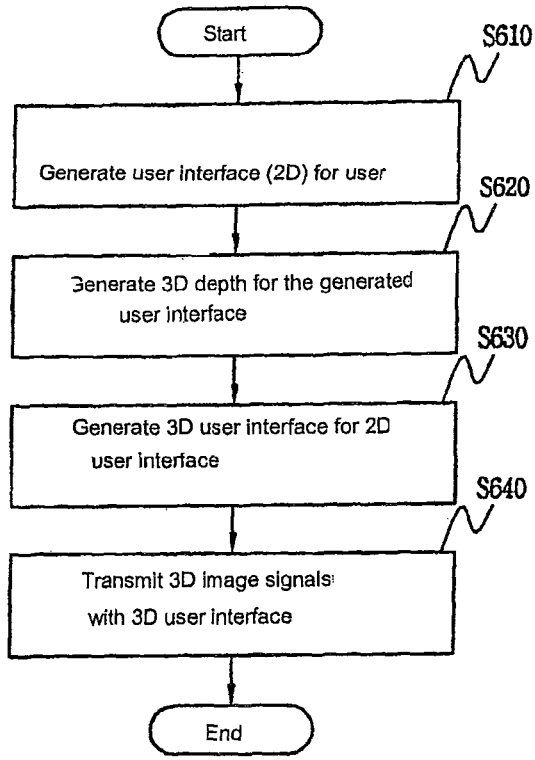
FIG. 6 is a operational flow chart illustrating a method of providing 3D UI on a stereoscopic image display by allowing the stereoscopic image display of invention to generate and apply a 3D depth to 2D UI.

Next, referring to FIG. 6, the operation of a stereoscopic image reproduction device will be described in detail. FIG. 6 is a operational flow chart illustrating a method of providing 3D UI on a stereoscopic image display by allowing the stereoscopic image display of the invention to generate and apply a 3D depth to the 2D UI.

The UI generator 310 generates a user interface (UI) for the user (S610). At this time, the generated UI has a conventional 2D format, and an example of the UI may include the foregoing On Screen Display (OSD).

The depth information processor 320 generates a 3D depth for the UI with a 2D format which has been generated from the UI generator 310 (S620). Here, factors that can be used to generate a 3D depth may include blur, textual gradient, linear perspective, shading, color, brightness, chroma, and the like. The depth information processor 320 may use one or more combinations of such factors to generate a 3D depth for 2D UI.

Next, the formatting unit 330 generates a 3D UI for the UI with a 2D format which has been generated from the UI generator 310 using a 3D depth generated from the depth information processor 320 (S630).

Subsequently, the formatting unit 330 performs formatting on 3D image signals based on the stereoscopic image display, and transmits the formatted signal together with the generated 3D UI (S640).

In this manner, a stereoscopic image reproduction device according to embodiments described herein may provide a user interface (UI) with a 3D format on a stereoscopic image display.

According to another embodiment described herein, it may be also configured such that settings for a 3D depth can be changed by user selection.

In other words, stereoscopic effects implemented on 3D UI may be desirably adjusted according to the user's preferences. To this end, according to embodiments described herein, a plurality of depth sets can be stored for each factor, and the user can adjust a 3D depth using such depth sets.

In this case, a separate storage unit may be provided to store a plurality of depth sets selectable for each factor by the user.

Figure 7:
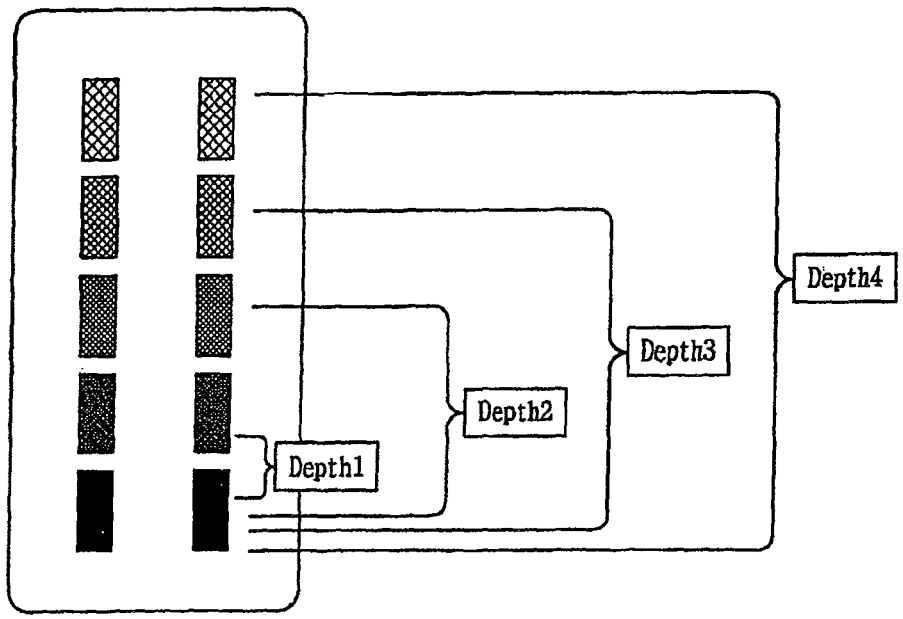
FIG. 7 is a view illustrating an example of a plurality of depth sets that can be provided for a color factor when color is used as a factor for generating a 3D depth on a 2D user interface.

An example of such a plurality of depth sets is illustrated in FIG. 7, which is a view illustrating an example of a plurality of depth sets that can be provided for a color factor when color is used as a factor for generating a 3D depth.

In this case, the user may select any one of the depth sets for color, "depth 1" through "depth 4", to apply such to the stereoscopic effect of the 3D UI.

On the other hand, according to another embodiment described herein, the user can adjust the level of the stereoscopic effect for each factor.

Figure 8:
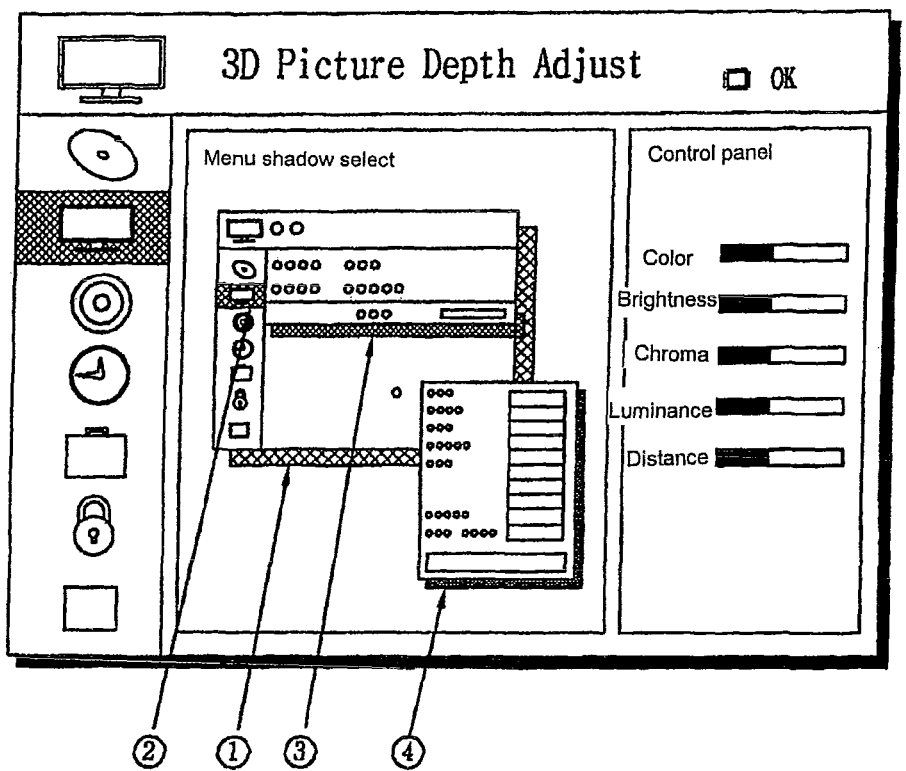
FIG. 8 is a view illustrating an example of configuring a 3D picture depth adjust window for adjusting stereoscopic image effects for each factor by the user.

FIG. 8 is a view illustrating an example of configuring a 3D picture depth adjust window for adjusting stereoscopic image effects for each factor by the user. FIG. 8 illustrates a configuration in which the user enters a menu corresponding to "menu shadow select" on a 3D picture depth adjust window. In the corresponding menu, shadow portions corresponding to menu select regions/menu non-select regions can be adjusted for each window.

In other words, shadow regions (1) through (4) in FIG. 8 can be controlled, wherein regions (1) and (4) are divided into windows that are different from each other, and window region (4) is a sub-menu of window region (1). On the other hand, regions (2) and (3) are shadow regions corresponding to selected menu regions, wherein shadow depths thereof can be adjusted to distinguish them from non-selected menu regions.

In the control panel of FIG. 8, control menus for color, brightness, chroma, luminance and distance are shown, but not necessarily limited to such, and may be also similarly applied to factors such as blur, textual gradient, linear perspective, shading, and the like.

Figure 9:
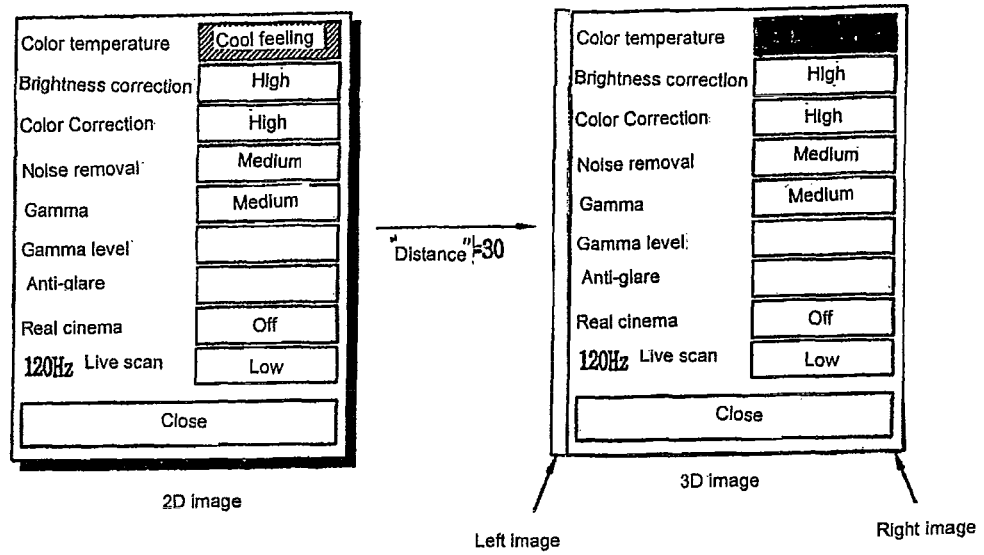
FIG. 9 is an exemplary view illustrating a change of the stereoscopic image effects applied to 3D UI when adjusting a value of "distance" on the control panel of FIG. 8.
Figure 9:
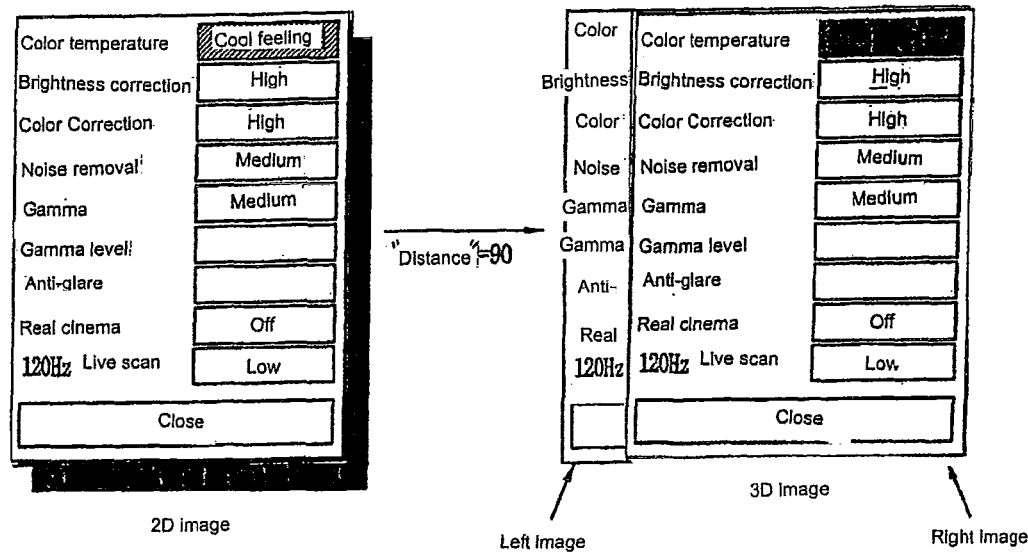

FIG. 9 is an exemplary view illustrating a change of the stereoscopic image effects applied to 3D UI when adjusting a value of "distance" on the control panel of FIG. 8. FIG. 9A illustrates a stereoscopic effect applied to the 3D UI when a "distance" value of the control panel is 30, and FIG. 9B illustrates a stereoscopic effect applied to the 3D UI when a "distance" value of the control panel is 90.

As illustrated in FIG. 9, a stereoscopic image reproduction device according to embodiments described herein may adjust a "distance" value of the control panel, thereby controlling the level of a distance effect applied to the 3D UI.

In other words, in case where the level of a distance effect is set between 0 and 100, a depth value for left and right images may be decreased by decreasing a value of "distance" to obtain a near distance effect, whereas a depth value for left and right images may be increased by increasing a value of "distance" to obtain a far distance effect.

As described above, according to a stereoscopic image reproduction device and method described herein, a user interface (UI) with a 3D format may be provided on a stereoscopic image display, and also stereoscopic effects on the user interface (UI) with a 3D format provided on the stereoscopic image display may be controlled. Accordingly, it may be possible to enhance user satisfaction for such stereoscopic image reproduction device through such stereoscopic effects.

According to another embodiment described herein, it may be also possible to convert a user interface with a 3D format into a conventional 2D format through user selection. In this case, a stereoscopic image reproduction device may process and display the 2D UI using the existing methods without generating a 3D depth for the 2D UI when receiving the user's 2D conversion selection input.

Various embodiments have been disclosed herein to describe an original concepts associated with several aspects described herein. However, one or more practical features in a specific embodiment may be applicable to one or more other embodiments. Some elements or steps described in each embodiment and its associated drawings may be modified and additional elements and/or steps may be deleted, moved, or included therein.

Various features and concepts described herein may be implemented by using software, hardware, firmware, middleware, or some combination thereof. For example, computer programs (executed by a computer, a processor, a controller, etc.) stored in a computer-executable medium may include one or more program code sections for performing various operations to implement the reproduction of a stereoscopic image and a stereoscopic image reproduction device according to embodiments described herein. Similarly, software means (executed by a computer, a processor, a controller, etc.) stored in a computer-executable medium may include part of a program code for performing various operations to implement the reproduction of a stereoscopic image and a stereoscopic image reproduction device.

The described embodiments may be applicable to various types of devices configured to form stereoscopic images, namely, all kinds of devices for displaying stereoscopic images such as a digital TV, an LCD display device, a personal media player (PMP), a portable phone, a computer monitor, and the like.

Various concepts described herein may be implemented in various forms within the scope of the described embodiments, and it should be understood by those skilled in the art that the foregoing embodiments will not be limited by the forgoing detailed description, and should be broadly construed within the scope of the technical aspects defined by the appended claims unless otherwise particularly specified. All changes and modifications that fall within the scope or equivalents thereof are therefore intended to be embraced by the appended claims.

What is claimed is:

1. A stereoscopic image reproduction device for providing a three-dimensional user interface, the device comprising:
   a user interface generator configured to generate a user interface with a two-dimensional (2D) format;
   a depth information processor configured to generate three-dimensional depth information for the generated 2D user interface;
   a storage unit configured to store depth sets for each factor to adjust the three-dimensional depth information; and
   a formatting unit configured to:
      analyze the generated 2D user interface to extract the three-dimensional depth information,
      generate a three-dimensional user interface for the generated 2D user interface using the three-dimensional depth information, and
      format three-dimensional image signals based on a stereoscopic image display to transmit the formatted signals together with the generated three-dimensional user interface,
   wherein a level of stereoscopic effects for each factor is adjusted by a user's input using the stored depth sets, and wherein the level of stereoscopic effects is applied differently on each region of the three-dimensional user interface.

2. The device of claim 1, wherein the depth information processor is formed with the formatting unit in an integrated manner.

3. The device of claim 1, wherein factors used to generate the three-dimensional depth information comprises at least one of blur, textual gradient, linear perspective, shading, color, brightness, and chroma.

4. The device of claim 1, wherein the three-dimensional user interface is converted into the 2D user interface by a user's two-dimensional conversion selection input.

5. The device of claim 1, wherein the user interface has an On Screen Display format.

6. The device of claim 1, wherein each region comprises at least one of a selected region, a non-selected region, and shadow regions thereof.

7. A stereoscopic image reproduction method for providing a three-dimensional user interface, the method comprising:
   generating a user interface with a 2D format;
   generating three-dimensional depth information for the generated 2D user interface;
   storing depth sets for each factor to adjust the three-dimensional depth information;
   generating a three-dimensional user interface for the generated 2D user interface using the three-dimensional depth information; and
   formatting three-dimensional image signals based on a stereoscopic image display to transmit the formatted signals together with the generated three-dimensional user interface,
   wherein a level of stereoscopic effects for each factor is adjusted by a user's input using the stored depth sets, and
   wherein the level of stereoscopic effects is applied differently on each region of the three-dimensional user interface.

8. The method of claim 7, wherein factors used to generate the three-dimensional depth information comprises at least one of blur, textual gradient, linear perspective, shading, color, brightness, and chroma.

9. The method of claim 7, wherein the three-dimensional user interface is converted into the 2D user interface by the user's conversion selection input.

10. The method of claim 7, wherein the user interface has an On Screen Display format.

11. The method of claim 7, wherein each region comprises at least one of a selected region, a non-selected region, and shadow regions thereof.

* * * * *